United States Patent [19]
Johannes

[11] Patent Number: 4,713,971
[45] Date of Patent: Dec. 22, 1987

[54] DEVICE FOR DETERMINING THE VELOCITY IN A FLOWING FLUID BY USE OF THE ACOUSTIC DOPPLER-EFFECT

[76] Inventor: Wilhelmus Johannes, Tuinstraat 37, 2613 RB Delft, Netherlands

[21] Appl. No.: 865,727

[22] PCT Filed: Aug. 23, 1985

[86] PCT No.: PCT/NL85/00035
§ 371 Date: May 27, 1986
§ 102(e) Date: May 27, 1986

[87] PCT Pub. No.: WO86/01605
PCT Pub. Date: Mar. 13, 1986

[30] Foreign Application Priority Data
Aug. 24, 1984 [NL] Netherlands .......................... 8402588

[51] Int. Cl.$^4$ ............................................... G01F 1/66
[52] U.S. Cl. ............................................... 73/861.25
[58] Field of Search ..................... 73/861.25; 367/901

[56] References Cited
U.S. PATENT DOCUMENTS
3,675,192  7/1972  Fahrbach ..................... 73/861.25 X
4,117,538  9/1978  Shrader et al. ..................... 364/517
4,413,531 11/1983  Karplus et al. ................... 73/861.25

FOREIGN PATENT DOCUMENTS
0060128  9/1982  European Pat. Off. .

Primary Examiner—Charles A. Ruehl
Attorney, Agent, or Firm—Frishauf, Holtz, Goodman & Woodward

[57] ABSTRACT

The measured intensities of separate ultrasonic frequency components furnished by respective bandpass filters of the spectrum analyzer portion of an audio frequency Doppler-effect flow meter are converted into digital values and the related values of noise intensity are calculated by applying weighting factor to these digital intensity values. The noise intensity values are subtracted from the observed intensity values to provide corrected signal intensity values these corrected values are then compared by a digital processor to determine, from the frequency of maximum corrective intensity value, the mean rate of flow which the ultrasonic transducer and receiver has observed. The output of the bandpass filters of lowest and highest frequency range are respectively multiplied by a first weighting factor of between 0.65 and 0.85 and by a second weighting factor of between 0.35 and 0.45 and weighting factors for other frequency components are then calculated by a function generator by reference to a monotonic curve having extreme values equal to the first and second weighting factors.

3 Claims, 3 Drawing Figures

DEVICE FOR DETERMINING THE VELOCITY IN A FLOWING FLUID BY USE OF THE ACOUSTIC DOPPLER-EFFECT

The invention relates to a device for determining the (mean) velocity in a flowing fluid, of the type including an ultrasound transmitter and a receiver coupled therewith for receiving ultrasounds reflected from the fluid, which are amplified and demodulated so as to produce a low-frequency Doppler-signal, that is subsequently analyzed by a spectrum analyzer, consisting of a number (n) of bandpass filters, peak detectors being provided to determine the energy values of the frequency components obtained by said bandpass filters, and a calculation unit being used to calculate that frequency, at which the low-frequency Doppler-signal appears to have a maximum, the latter being a measure for the mean velocity of flow.

A device of this type is known from the DE-PS No. 1,791,191 in which the application for determining the flow rate of blood in blood vessels is described. The velocity values obtained by this well-known device appear to deviate rather substantially from the values obtained by means of an other well-known type of meter, the electromagnetic flowmeter, which is generally considered as an accurate one.

The measuring device, operating according to the Doppler principle, however, has the practical advantage over other types of flowmeters, that it may also be used in circumstances in which other types of measuring devices would not be useful or less appropriate. For as a matter of fact this meter can be easily put in place, is not subject to wastage and is relatively inexpensive.

SUMMARY OF THE INVENTION

It is therefore an object of this invention to improve the device of the type above referred to and more particularly to improve its measuring accuracy.

Tests run in flowing fluids of different composition, density and volume rate, have led to the inference that interference in the Doppler-spectrum caused by background noise, is taking place in a rather fixed distribution over the individual frequency bands. It has been found that the successively measured frequency components may be approximately corrected to the actual Doppler-spectrum with the aid of a simple correction curve, which is substantially determined by the intensities, measured by the bandpass filters at the lower and upper limits of the spectrum respectively.

On the basis of this insight, the device according to the invention is characterized in that the calculation unit includes components which are designed to cause the measured energy values of the individual frequency components of the frequency spectrum to decrease according to a monotonically decreasing correction curve.

According to a further feature of the invention, the calculation unit is adapted to operate according to a correction curve, which connects a location representing a value between 65% and 85% of the energy value measured by the lowest bandpass filter with a location representing a value between 35% and 45% of the energy value measured by the highest bandpass filter.

BRIEF DESCRIPTION OF THE DRAWINGS

The invention is further explained, by way of example, with reference to the accompanying drawings wherein.

DESCRIPTION OF THE ILLUSTRATED EMBODIMENT

Figure 1:
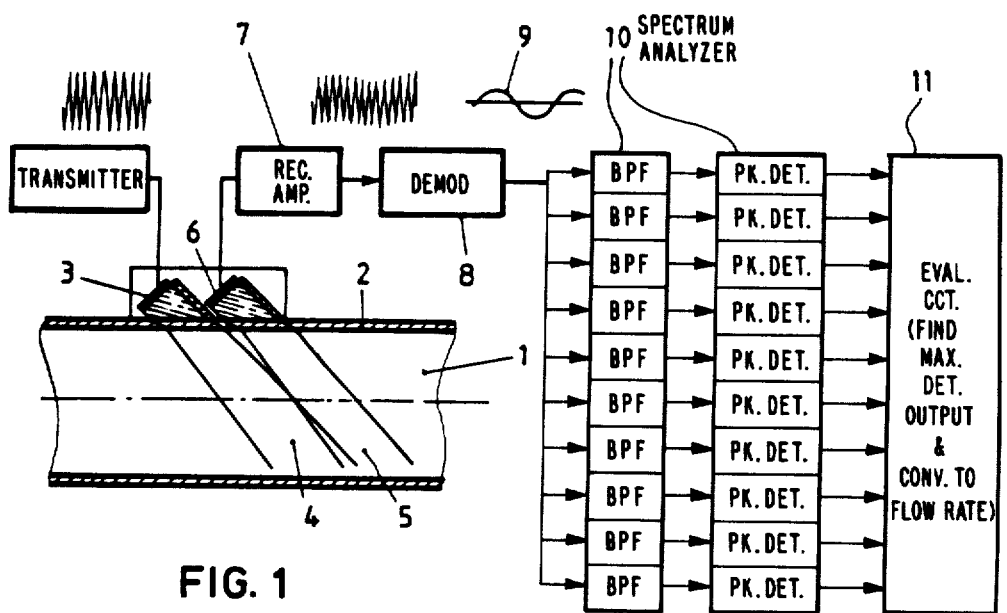
FIG. 1 is a block diagram showing the device according to the invention.

The device for determining the flow rate of a fluid flowing through a pipe, as diagrammatically shown in FIG. 1, comprises a transmitter 3 placed on the pipe wall 2, which transmits a beam of sound waves 4. The beam of sound waves 5 reflected from the flowing fluid is received by a receiver 6 also placed on the pipe wall 2. The Doppler-effect causes a frequency shift between the transmitted and received beams of sound waves. This frequency shift is expressed in the energy spectrum of the output signal of receiver 6. Upon amplification in block 7 and demodulation in block 8 the low-frequency Doppler-signal is obtained from this signal. An example of the energy spectrum of a low-frequency Doppler-signal is indicated by the line 15 in FIG. 2.

Figure 2:
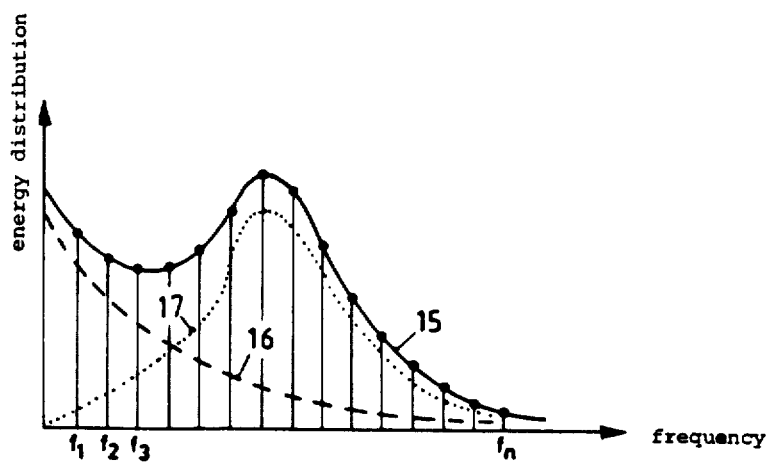
FIG. 2 shows a Doppler-energy spectrum of a medium.

FIG. 2 also shows two further curves 16 and 17. The curve 16 represents the noise in the total energy spectrum 15 and curve 17 represents the corrected energy spectrum.

The Doppler-signal 9 is applied to a spectrum analyzer in block 10, which comprises a series of n bandpass filters, which cover the total spectrum and the bandwidths of which are preferably equal. The output of each of the n bandpass filters are connected to a peak detector, which determines the energy intensity of the respective frequency band (see the measuring points in FIG. 2). The output signals of the n peak detectors are supplied to a calculation unit, making part of block 10. So far the measuring device corresponds to the prior art.

Unlike the prior art, where the mean frequency as a measure of the flow rate is immediately determined from the n peak detector signals by the following equation:

$$f_{mean} = \frac{\Sigma f_m I_m (f_m)}{\Sigma I_m (f_m)}$$

in which $I_m$ is the intensity measured by bandpass filter m and $f_m$ is the filter frequency, the calculation unit of the device according to the invention is constituted in such a way, that first n modified or corrected intensity values are determined from the individual peak detector signals. These modified or corrected values are represented by the curve indicated by the broken line 17 in FIG. 2, which is obtained by subtracting the intensity values of curve 16 from the respective intensity values of curve 15. An example of the calculation unit in the device according to the invention is shown in FIG. 3.

Figure 3:
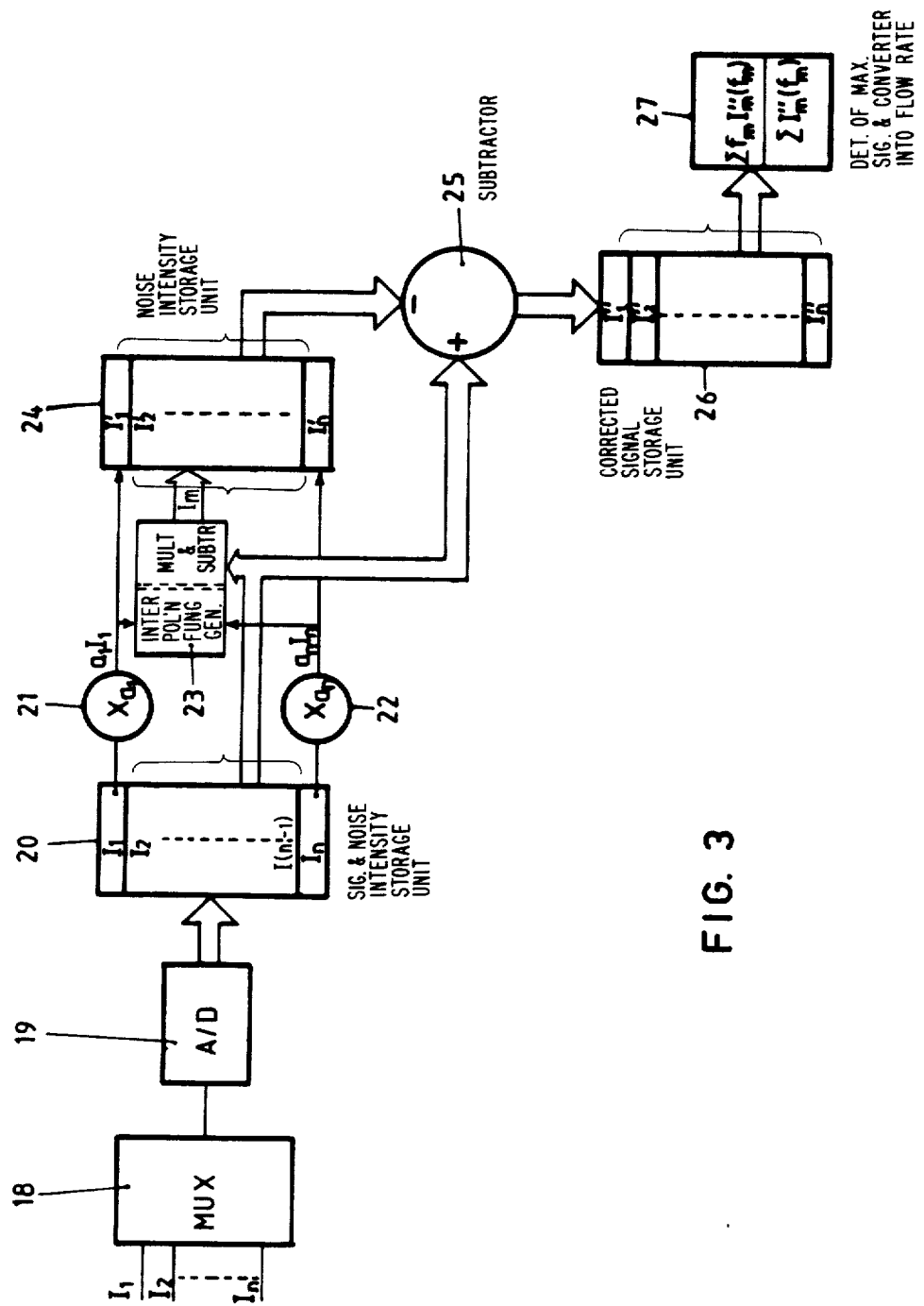
FIG. 3 shows the calculation unit of the spectrum analyzer block of FIG. 1.

In FIG. 3 the n output signals of the n peak detectors are supplied to a multiplexer 18. The multiplexer 18 successively connects its n inputs with its output. The n intensity signals $I_1$–$I_n$, which successively appear at the output of the multiplexer 18, are each converted into a digital value by means of an analog-digital converter 19. The n digital intensity values are stored in n operating registers 20-1 to 20-n. The monotonically decreasing curve 16 in FIG. 2 may, as proven by a large number of test measurements, be simply approximated by a straight line. The latter is determined by the intensity values at the limits of the energy spectrum 15 i.e. the intensities determined by the first and n-th peak detectors. The noise contribution to the total energy intensity is between 65% and 85% at the lowest frequency ($f_1$) and between 35% and 40% at the highest frequency. The intensity values $I_1$ and $I_n$ from the registers 20-1 and 20-n are respectively multiplied by a factor $a_1$ not less than 0.65 and not exceeding 0.85 and by a factor $a_n$ not less than 0.35 and not exceeding 0.45 in the multiplier devices 21 and 22 respectively to produce weighted intensity values. The outputs of the multiplier devices 21 and 22 are connected with a device 23, which determines the slope of the straight line drawn between the points $a_1I_1,f_1$ and $a_nI_n,f_n$ on a graph of weighted intensity versus frequency, according to the following equation:

$$tan\left(\frac{a_1I_1 - a_nI_n}{f_n - f_1}\right) = a_3$$

The intensity values of the noise contribution curve 16 in FIG. 2 may be determined, by approximation, from the output signals of the multiplier devices 21 and 22 and weighted intensity calculating means within the device 23 operating according to the following equation:

$$I'_m = a_1I_1 - a_3(f_m - f_1)$$

in which $I'_m$ is the weighted noise intensity at frequency $f_m$. m has a value between 1 and n and designates a particular frequency between $f_1$ and $f_n$ at which a measurement is to be observed.

The noise contribution intensities (correction curve) $I_1'$ to $I_n'$ are stored in a correction table 24. The n values from the correction table 24 are supplied to the inverting input of an adding device 25. The intensity values $I_1$ to $I_n$ from the n registers 20-1 to 20-n are supplied to the non-inverting input of the adding-device 25. The noise contribution intensities $I_1'$ to $I_n'$ are subtracted from the respective total intensities $I_1$ to $I_n$ by means of device 25, so that a table 26 of corrected intensities $I_1''$ to $I_n''$ is obtained. The corrected intensities $I_1''$ to $I_n''$ constitute curve 17 in FIG. 2. Thereafter the mean frequency $f_{mean}''$ is determined from this table by means of device 27, including adders, multipliers and dividers, in a well-known manner, e.g. the manner described in the aforementioned German Patent Specification, according to the following equation:

$$f_{mean}'' = \frac{\Sigma f_m I_m'' (f_m)}{\Sigma I_m'' (f_m)}$$

Finally, this means frequency $f_{mean}''$ is converted, in block 11 (FIG. 1), into a value indicative of the flow rate by means of a conversion factor, determined by the transmitting frequency and the sensor geometry.

The functions and processes described hereinabove with reference to the diagram of FIG. 3 can be easily accomplished in a simple processor specifically designed for this purpose.

I claim:

1. In a device for determining the velocity in a flowing fluid, of the type including an ultrasound transmitter and a receiver coupled therwith for receiving ultrasounds reflected from the fluid, which are amplified and demodulated therein so as to produce a low-frequency Doppler-signal, a spectrum analyser for detecting the frequency of said Doppler-signal, consisting of a number (n) of bandpass filters of different passband frequency ranges, peak detectors for measuring the energy values of the respective individual frequency components passed by said bandpass filters, and a calculation unit for calculating the frequency at which the low-frequency Doppler-signal appears to have a maximum, the latter being a measure for the mean flow velocity, the improvement comprising, in combination means, in said calculation unit, for providing a first decrementation factor for the frequency component passed by the bandpass filter which has the lowest passband frequency range and a second decrementation factor, which is smaller than said first decrementation factor and therefore produces more decrementation than said first decrementation factor, for the frequency passed by the bandpass filter which has the highest passband frequency range, interpolating means for providing respective decrementation factors for said frequency components passed respectively by the remainder of said bandpass filters, by reference to a monotonic interpolation function for interpolating between said first and second decrementation factors, means for multiplying said measured energy values respectively by said decrementation factors to produce noise energy values and means for subtracting said noise energy values from the respective corresponding measured energy values to produce corrected energy values.

2. Improvement in a device according to claim 1 wherein said first decrementation factor is a percentage factor between 65% and 85% and said second decrementation factor is a percentage factor between 35% and 45%.

3. Improvement in a device according to claim 1, wherein said interpolation function is a straight line.

* * * * *

UNITED STATES PATENT AND TRADEMARK OFFICE
CERTIFICATE OF CORRECTION

PATENT NO. : 4,713,971

DATED : December 22, 1987

INVENTOR(S) : Wilhelmus J.G.J. Der Kinderen

It is certified that error appears in the above-identified patent and that said Letters Patent is hereby corrected as shown below:

On the Abstract page, Item [76] in the name of the inventor, replace "Johannes" by -- Wilhelmus J. G. J. Der Kinderen --.

Signed and Sealed this

Twenty-eighth Day of June, 1988

Attest:

DONALD J. QUIGG

Attesting Officer

Commissioner of Patents and Trademarks